Figure 1:
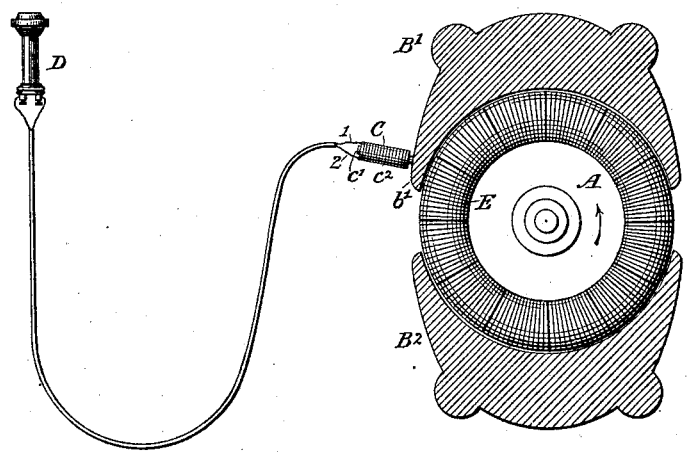

(No Model.) 2 Sheets—Sheet 1.
J. W. EASTON.
METHOD OF AND APPARATUS FOR DETECTING SHORT CIRCUITS IN DYNAMO ELECTRIC MACHINES.

No. 363,129. Patented May 17, 1887.

Witnesses
Geo. W. Breck.
Carrie E. Ashley

Inventor
James W. Easton,
By his Attorneys
Pope & Edgcomb (No Model.) 2 Sheets—Sheet 2.

J. W. EASTON.
METHOD OF AND APPARATUS FOR DETECTING SHORT CIRCUITS IN DYNAMO ELECTRIC MACHINES.

No. 363,129. Patented May 17, 1887.

Witnesses
Geo. W. Breck
Charles A. Terry

Inventor
James W. Easton,
By his Attorneys
Pope & Edgecumb

UNITED STATES PATENT OFFICE.

JAMES W. EASTON, OF NEW YORK, N. Y.

METHOD OF AND APPARATUS FOR DETECTING SHORT CIRCUITS IN DYNAMO-ELECTRIC MACHINES.

SPECIFICATION forming part of Letters Patent No. 363,129, dated May 17, 1887.

Application filed September 4, 1886. Serial No. 212,688. (No model.)

*To all whom it may concern:*

Be it known that I, JAMES W. EASTON, a subject of the Queen of Great Britain, residing in New York, in the county and State of New York, have invented certain new and useful Improvements in Method of Discovering Short Circuits in Electric Machines, of which the following is a specification.

My invention relates to a method of determining whether or not the bobbin of a dynamo-electric generator or other form of electric machine has become short-circuited.

In operating dynamo-electric machines it sometimes chances that one or more of the bobbins becomes short-circuited; but it is difficult to determine whether or not this is the case without stopping the machine and examining it.

The object of my invention is to provide means for discovering any such short circuit while the machine is in operation and running under a load without stopping it, unless it should be found necessary for the purpose of repairing the machine after such short circuit is discovered, and also to provide means for automatically interrupting the connections of the field-magnet should such a short circuit occur. The method whereby I accomplish this result consists in applying an induction device to some point upon one of the field-magnets in such manner that variations in magnetism which will be occasioned by reason of the short circuit shall produce an electric current in an independent circuit, and in employing this current to operate an indicating device—such, for instance, as a telephone receiver or vibrating bell, or a circuit-controlling device applied to the field-magnet circuit, or both. This method depends upon the fact that when a bobbin becomes short-circuited and the armature continues to revolve in the magnetic field, the current through that bobbin induces an excessive amount of magnetism in the corresponding portion of the armature, and this in turn increases the magnetism of the pole-pieces of the field-magnet as it passes across their fields. The points at which I have found the most noticeable effect to be produced are near the ends of the pole-pieces, and therefore it is preferable to apply the induction device at one of those points.

The induction device may consist of a soft-iron core surrounded by a coil of insulated wire connected in a closed circuit, including the indicating device. It is not necessary always to employ a soft-iron core, but a coil of thick wire may be substituted. Preferably a core is employed, and this extends a little beyond the coil, and is placed in magnetic contact with one of the pole-pieces near its end. It may be permanently in connection therewith, but it is preferably applied only when the device is to be used.

Figure 2:
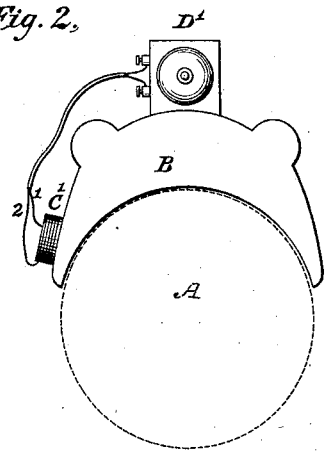
Figure 3:
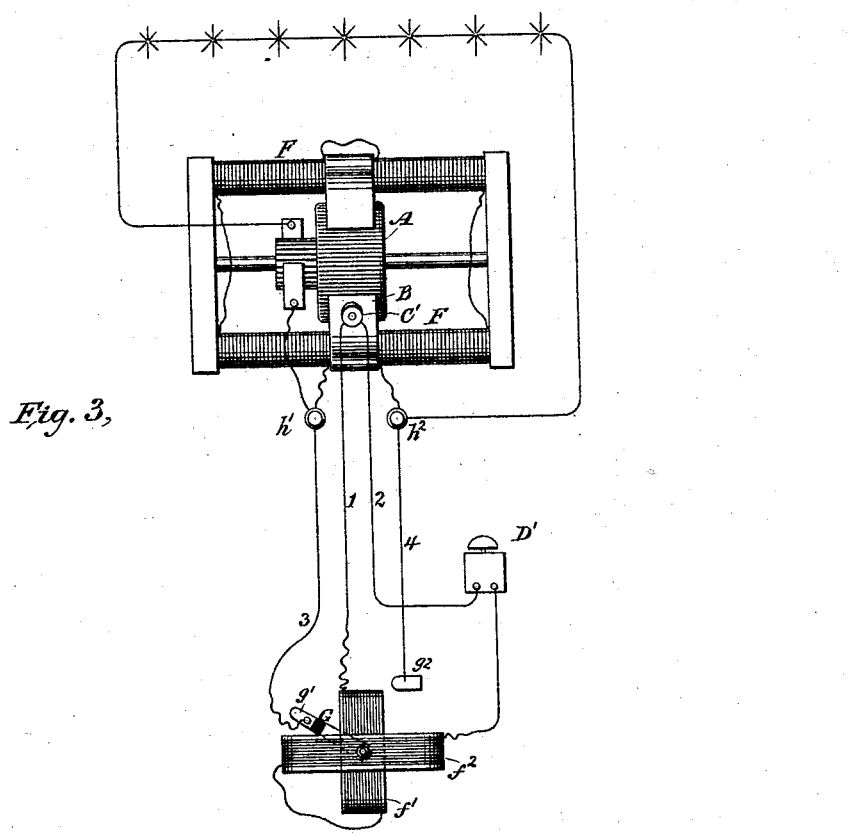

In the accompanying drawings, Figure 1 is a transverse section of a generator, showing the method of employing the induction device and indicator. Fig. 2 illustrates a generator equipped with an indicating device designed to be permanently in connection therewith. Fig. 3 illustrates the application of the circuit-controlling device.

Referring to the drawings, A represents the armature of a dynamo-electric generator, and $B'$ $B^2$ the pole-pieces of the field-magnets. To one end, $b'$, of one of the pole-pieces, and preferably the end from which the armature revolves, there is applied an induction-magnet, C, consisting of a core, $c'$, surrounded by a coil of insulated wire, $c^2$. The coil is included in a closed circuit consisting of the conductors 1 and 2, which include in this instance the telephonic receiver D. A magneto-bell or other signaling device may be substituted for the receiver D.

Supposing a bobbin, E, of the armature should be short-circuited while the machine is running, the current through the bobbin will induce an excessive amount of local magnetism, and also an excessive amount of heat. The magnetic effect would result in an increased magnetism in the pole-pieces adjacent thereto. The effect is the more noticeable at the point where the armature leaves the pole-pieces. At this point the magnetic effect rises and falls quickly, and it is for this reason that the induction device is preferably applied at this point. The variations in the magnetism of the pole-pieces produces corresponding variations in the magnetism of the core $c$, and these variations induce alternating currents in the conductors 1 and 2. These currents operate the receiver or indicating device D.

In Fig. 2 the induction device is represented as being permanently applied to the pole-piece, as shown at C', and it consists in this instance simply of a coil of insulated wire, the core being dispensed with. This coil is preferably short, but of considerable diameter. It is connected in the circuit 1 2, as before, and the indicating-bell D' is represented as included in the circuit, the whole device being a permanent fixture to the machine.

In Fig. 3 the circuit-controlling device for the field-magnet coils F is illustrated. It consists of two coils, $f'$ and $f^2$, the former pivoted within and movable independently of the latter. These coils are connected in the circuit of the conductors 1 and 2, together with the device D'.

An arm, G, having an insulated point, $g'$, is carried by the coil $f'$. This point is connected by a conductor, 3, with one terminal, $h'$, of the field-magnet, and a contact-point, $g^2$, is connected by a conductor, 4, with the other terminal of the coil F at a point, $h^2$. When a current is established in the conductors 1 and 2, the coil $f'$ tends to set itself parallel with the coil $f^2$, and thus to move the arm G into contact with the point $g^2$ and complete the short-circuit connections between the terminals of the field-magnet coils.

It is not necessary that the induction device should in all cases be applied to the field-magnet, for it is evident that it may be placed at any point influenced by the variations in magnetism. A very sensitive point I have found to be near the portion of the armature diametrically opposite the exciting-pole, where only such pole is used.

I claim as my invention—

1. The hereinbefore-described method of detecting short circuits in electric machines, which consists in establishing an induced current in an independent circuit by the variations in the magnetism due to the short circuit, and in operating a signaling device by such induced current.

2. The combination, with a dynamo-electric or other generator, of an induction device applied to a pole of the field-magnet of the same, a closed circuit including such device, and an indicating device included in said closed circuit.

3. The combination, with a dynamo-electric or other generator, of a soft-iron core applied to the pole-piece of the same, a coil of insulated wire surrounding said core, a closed circuit including said coil, and a telephonic receiver included in said closed circuit.

4. The combination, with a dynamo-electric or other generator, of a coil of insulated wire applied to a pole of the field-magnet of the same at or near the point where the armature leaves the pole-piece, a closed circuit including said coil, and an indicating device included in said circuit, substantially as described.

5. The combination, substantially as described, with an electric machine, of an induction device, a circuit-controlling device for the field-magnet circuit, and an electrical device included in the circuit of the induction device for operating said circuit-controlling device to place the terminals of the field-magnet coils in connection with each other, substantially as described.

In testimony whereof I have hereunto subscribed my name this 3d day of September, A. D. 1886.

JAMES W. EASTON.

Witnesses:
DANL. W. EDGECOMB,
CHARLES A. TERRY.